United States Patent
Yeandle et al.

(12) 
(10) Patent No.: US 6,220,766 B1
(45) Date of Patent: Apr. 24, 2001

(54) HERMETICALLY SEALED PACKAGE AND METHOD OF ASSEMBLY

(75) Inventors: Jonathan Charles Yeandle, Paignton; Andrew Paul Cornish, Swindon; Darren Lee Martin, Abingdon, all of (GB)

(73) Assignee: Bookham Technology PLC (GB)

(*) Notice: Subject to any disclaimer, the term of this patent is extended or adjusted under 35 U.S.C. 154(b) by 0 days.

(21) Appl. No.: 09/139,450

(22) Filed: Aug. 25, 1998

(30) Foreign Application Priority Data

Jul. 6, 1998 (GB) .................................................. 9814643

(51) Int. Cl.⁷ ...................................................... G02B 6/42
(52) U.S. Cl. .............................. 385/94; 385/138; 385/80
(58) Field of Search ................................. 385/88–94, 138, 385/78, 80

(56) References Cited

U.S. PATENT DOCUMENTS

| | | | |
|---|---|---|---|
| 4,385,797 | * 5/1983 | Dubois et al. | 385/94 |
| 4,447,121 | 5/1984 | Cooper et al. | 350/96.2 |
| 5,177,806 | * 1/1993 | Abbott et al. | 385/76 |
| 5,613,026 | * 3/1997 | Nagata et al. | 385/94 |
| 5,613,031 | * 3/1997 | Tanabe et al. | 385/138 |
| 5,649,030 | 7/1997 | Benzoni et al. | 385/78 |
| 5,664,043 | 9/1997 | Donaldson et al. | 385/138 |
| 5,692,086 | * 11/1997 | Beranek et al. | 385/94 |

FOREIGN PATENT DOCUMENTS

| | | | |
|---|---|---|---|
| 0286319 | 3/1988 | (EP) | G02B/6/42 |
| 2198257 | 6/1988 | (GB) | G02B/6/24 |

OTHER PUBLICATIONS

Perryman, A.J., et al. "Packaging Considerations For Semiconductor Laser Diodes", Laser Diode Technology and applications, vol. 1043 (Jan. 18–20, fc1989), pp. 330–337.

* cited by examiner

Primary Examiner—Hemang Sanghavi
(74) Attorney, Agent, or Firm—Webb Ziesenheim Logsdon Orkin & Hanson, P.C.

(57) ABSTRACT

A hermetically sealed structure, particularly for use in an optoelectronic device is described. The structure comprises an outer sleeve of a material resistant to moisture ingress with an insert located in the sleeve at one end portion thereof and having a bore therethrough. An optical fibre extends through the bore and beyond the end portion of the sleeve with adhesive films respectively securing the insert to the sleeve and the optical fibre to the insert. A method of assembly for such a package is also described.

19 Claims, 2 Drawing Sheets

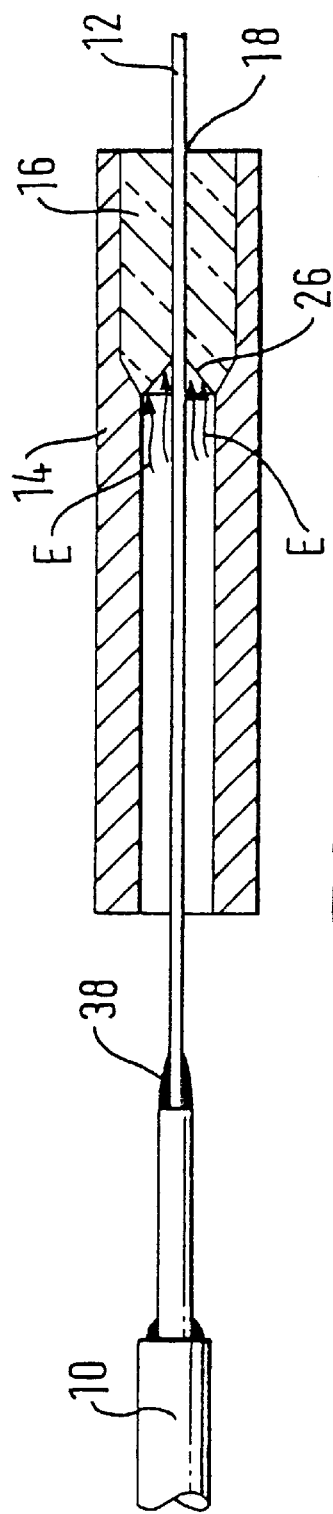
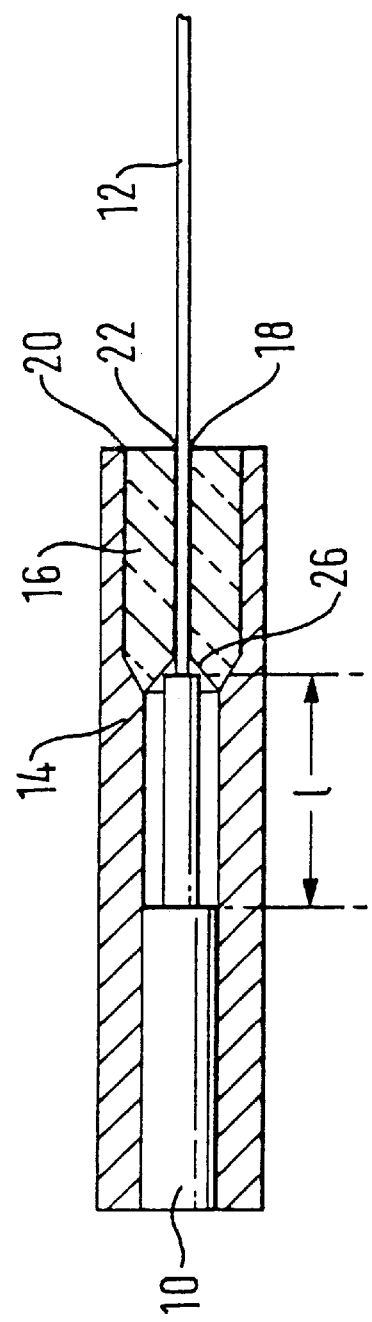

HERMETICALLY SEALED PACKAGE AND METHOD OF ASSEMBLY

BACKGROUND OF THE INVENTION

The present invention relates to a hermetically sealed package and a method of assembly therefor. The invention is particularly concerned with the provision of a hermetically sealed package for a fibre optic device.

FIELD OF THE INVENTION

Packaging of fibre optic devices is driven by the need to achieve low cost while at the same time maintaining high reliability for extended operational life, for example in excess of 20 years. It is particularly important to achieve hermeticity around the fibre optic cable as it enters the device package. In this context, the hermetic seal is required to provide a good barrier to the ingress of moisture which can cause damage to the fibre optic devices within the package.

According to one method for hermetically sealing of fibre optic cables, a glass to metal seal is formed between the fibre optic cable and its supporting tube or sleeve. This involves locally heating a stripped portion of the fibre optic cable to around 500° C. to reflow a precision solder glass bead, positioned at an appropriate place to form the seal. At the same time, the fibre jacket, or protective outer coating, must be maintained to below 90° C. to avoid damage to the coating. Control of the reflow profile is quite critical as high stress concentrations can lead to damage to the optical fibre and subsequent light attenuation in use.

According to another method, the fibre optic cable is coated with metal (for example titanium/platinum/gold or titanium/tungsten/gold) and then soldered to its support tube. This approach involves costly metal deposition processes to coat the fibre. It is also difficult to maintain adhesion of the coating to the fibre. In addition, as with the first method mentioned above, a heat process is required which can lead to stress and deformation of the fibre optic cable.

Thus, although these known methods do give reliable hermetic seals, they have inherent assembly difficulties and also compromise the cost objectives of packaging.

SUMMARY OF THE INVENTION

According to one aspect of the present invention there is provided a hermetically sealed structure comprising an outer sleeve of a material resistant to moisture ingress; an insert located within the sleeve at one end portion thereof, the insert having a bore therethrough, and an optical fibre extending through said bore and beyond the end portion of the sleeve, wherein respective adhesive films secure respectively the insert to the sleeve and the optical fibre to the insert.

According to another aspect of the present invention there is provided a method of assembling a hermetically sealed package comprising the following steps:

a) inserting an insert into a distal portion of a sleeve, the insert having a bore extending therethrough;

b) guiding an optical fibre along said sleeve from a remote portion thereof and through said bore;

c) applying a quantity of adhesive to a remote end of the optical fibre; and d) drawing the optical fibre through the sleeve whereby the adhesive is caused to flow between the insert and the sleeve and between the bore and the optical fibre to form respective seals therewith.

It will be understood that with a small gap available between the insert and the sleeve, and between the optical fibre and the bore, the adhesive flows due to capillary action. According to the example described herein, an epoxy resin is used to form a hermetic seal. This resin thus replaces the solder glass or metal solders which were used in the known techniques outlined above, and thus negates the need for high temperature processing. It is somewhat surprising that an epoxy resin provides an adequate hermetic seal, because epoxy resins in their bulk form have a tendency to permeate moisture and are not normally considered to be completely hermetic. However, by providing a thin film of epoxy resin at the interface between the insert and the sleeve on the one hand, and the optical fibre and the bore within the insert on the other hand, a fully hermetic seal can be established.

For a better understanding of the present invention and to show how the same may be carried into effect, reference will now be made by way of example to the accompanying drawings.

BRIEF DESCRIPTION OF THE DRAWINGS

FIG. 5 illustrates an intermediate assembly step; and

FIG. 6 illustrates a final structure of a ferrule.

DESCRIPTION OF THE PREFERRED EMBODIMENTS

Figure 1:
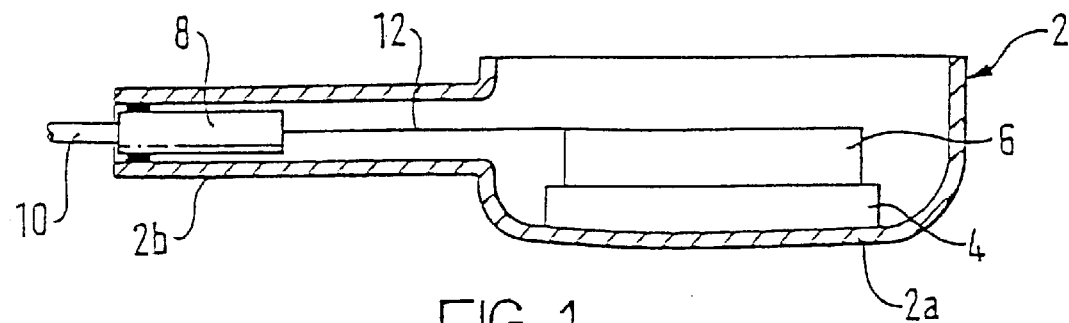
FIG. 1 illustrates in partial section a package containing an optic device.

FIG. 1 illustrates in partial section a package for an optics device. A casing 2 formed of a material such as a metallic alloy like KOVAR (Ni/Fe/Co) has a portion 2a for receiving a ceramic wafer 4 supporting an integrated optical device 6. The integrated optical device can take the form of a silicon on insulator wafer on which monolithic silicon waveguides have been formed. The casing 2 also has an entry portion 2b which is tubular and which holds a ferrule 8 which supports a fibre optic cable 10 such that a central optical fibre 12 of the fibre optic cable 10 is attached to the integrated optical device 6. Although not shown in FIG. 1, a lid is provided on the casing 2 to provide a sealed package. It is very important that the package is entirely hermetically sealed, particularly against the ingress of moisture which can have a damaging effect on interfaces of active optical elements on the wafer. The material of which the casing is formed, for example KOVAR, provides a good hermetic seal for the package itself. It is important however to additionally provide that leakage of moisture into the package is prevented. One location where moisture could leak is through the ferrule 8 itself, because this ferrule holds the fibre optic cable 10 so that there is in principle an entry path for moisture between the fibre optic cable and the external casing of the ferrule 8.

An assembly technique for a ferrule 8 in the form of a hermetically sealed structure is described herein which significantly reduces the ingress of moisture into the package. Firstly, the main components of the ferrule will briefly be pointed out with reference to the final structure illustrated in FIG. 6. The ferrule 8 has an outer casing 14 in which is located an insert 16 with a narrow central bore 18 through which the optical fibre 12 passes. The outer casing 14 holds at the other end of the ferrule the fibre optic cable 10. The outer casing 14 is formed of a substance such as a metal which has a high hermeticity. The insert 16 can be formed of, for example, ceramic. It is noted at this point that the ferrule holds a portion of optical fibre 12 which extends from the ferrule so as to allow it to be connected to the integrated optic device 6 in FIG. 1. This portion of the optical fibre 12 needs to be kept free of dirt and other foreign material so that the optical fibre 12 can function efficiently. Other important features of the final structure of FIG. 6 will become apparent from the following description of the assembly technique. It is nevertheless noted that in the final structure thin epoxy seals 20,22 are provided respectively between the insert 16 and the outer casing 14 and between the insert 16 and the optical fibre 12. The thin epoxy seals provide exceptionally good resistance to the ingress of moisture through the ferrule 8 into the package 2.

Figure 2:
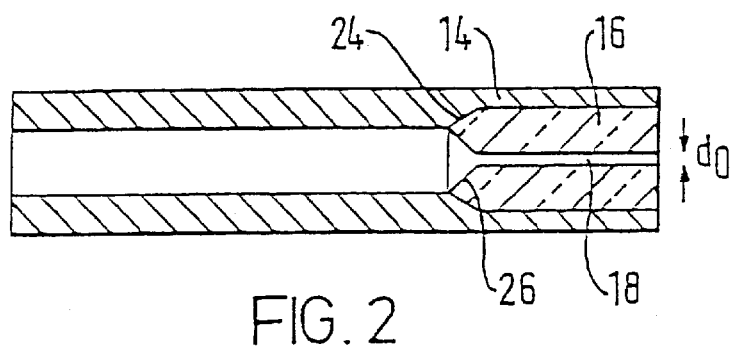
FIG. 2 is a section through a ferrule during a first assembly step.

The assembly technique for constructing the ferrule of FIG. 6 will now be described. FIG. 2 illustrates a first assembly step. The insert 16 is inserted into the outer casing 14 as a push-fit. The outer casing 14 has an internally stepped diameter marked at 24 against which a truncated conical face of the insert 16 rests. The insert 16 has a central counter bore 26 which extends into the central bore 18.

Figure 4:
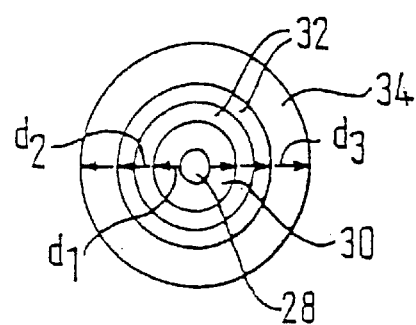
FIG. 4 is an end view along arrow IV in FIG. 3.

As a second or parallel assembly step, the fibre optic cable 10 is prepared for insertion. FIG. 4 illustrates the construction of the fibre optic cable 10. It comprises a central optical core 28 surrounded by optical cladding 30. This is covered by first and second supporting acrylic polymer layers 32 which are themselves held within a protective buffer layer 34. The diameter $d_2$ of the optic cladding is around 125 microns, the diameter $d_2$ of the outer acrylic coating 32 is around 250 microns, and the external diameter $d_3$ of the buffer 34 is around 900 microns. The internal diameter of the outer casing 14 is around 1 mm.

Figure 3:
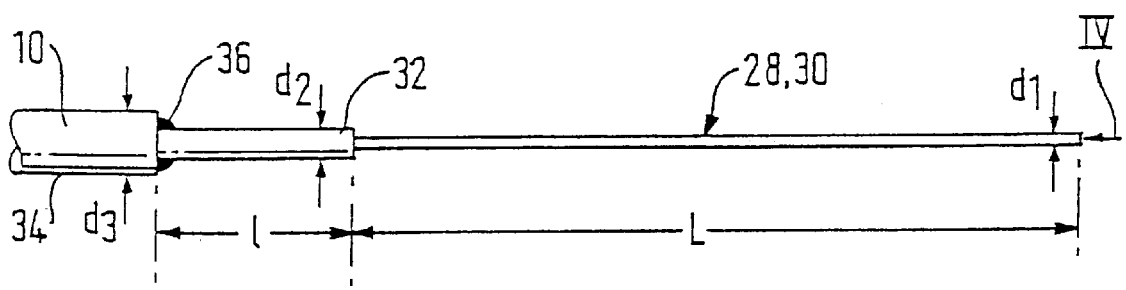
FIG. 3 illustrates a fibre optic cable during a second assembly step.

The acrylic polymer coatings 32 are stripped from a length L of the optical fibre, leaving the optical core 28 and cladding 30 over length L. The buffer layer only is stripped from a smaller length l and retained over the remainder of the fibre optic cable 10. An adhesive such as epoxy is used to secure the buffer to the acrylic polymer coating 32 at the location marked 36 in FIG. 3. This is merely to prevent slippage under tension between the buffer 34 and the remaining components of the optical fibre. The epoxy 36 can be applied at any convenient time during the assembly procedure, but is shown here for the sake of convenience prior to the assembly step now to be discussed with respect to FIG. 5.

According to FIG. 5, assembly of the ferrule takes place as follows. The length L of optical fibre 12 is inserted into the outer casing 14 of the ferrule and guided through the central bore 18 of the insert 16. Once it has been located and guided through the central bore 18 of the insert 16, a small amount of epoxy resin 38 is applied at the junction between the stripped length L and the acrylic coated length l. As the optical fibre cable 10 is pushed further into the ferrule casing 14, the epoxy 38 comes up against the insert 16 and starts to flow into the counter bore 26. As a result of capillary action, a thin film of epoxy creeps into the interface between the insert 16 and the outer casing 14 and between the optical fibre 12 and the inner bore 18 as indicated generally by the arrows E. Thus, by applying a controlled amount of epoxy and drawing the optical fibre 12 through the casing 14 in this manner, a thin film epoxy seal is provided both around the insert and around the optical fibre as designated by reference numerals 20 and 22 in FIG. 6.

The length l of buffer stripped acrylic polymer is such that the interface between the wholly-stripped portion L and the bufferstripped portion l lies just within the counter bore 26 of the insert 16. This has been found to be a particularly good location to resist fibre breakages during the life of the device. The provision of a length l of optical fibre which retains its acrylic polymer coating 32 has also been found to be advantageous in this respect. It is also pointed out that the technique described above leaves the external length of optical fibre 12 protruding from the ferrule free of epoxy resin.

The insert 16 has been described herein as being of ceramic. However, it will be appreciated that any precision machined material may be provided. The central bore 18 is precision machined to a tight tolerance to provide a close clearance with the fibre optic cable. In the present example, it is machined to an internal diameter of 126 microns.

What is claimed is:

1. A hermetically sealed package comprising:
   an outer sleeve of a material resistant to moisture ingress;
   an insert located within the sleeve at one end portion thereof, the insert having a bore therethrough; and
   an optical fibre extending through the bore and extending beyond the end portion of the sleeve, wherein:
   respective adhesive films secure the insert to the sleeve and the optical fibre to the insert;
   the optical fibre has a protective-coated portion held at the other end portion of the sleeve;
   the protective-coated portion has a protective coating surrounding the optical fibre;
   the protective-coated portion abuts the sleeve;
   an intermediate portion of optical fibre extends between the insert and the protective-coated portion; and
   the intermediate portion is covered by one or more intermediate surrounding layers.

2. A package according to claim 1, wherein the insert comprises a counter bore in communication with the bore receiving the optical fibre to allow for the ingress of adhesive during assembly.

3. A package according to claim 2, wherein the portion of optical fibre provided with the at least one intermediate surrounding layer terminates within the counter bore.

4. A package according to claim 3, wherein the adhesive is epoxy resin.

5. A package according to claim 3, wherein the insert is a push fit with respect to the sleeve.

6. A package according to claim 2, wherein the adhesive is epoxy resin.

7. A package according to claim 2, wherein the insert is a push fit with respect to the sleeve.

8. A package according to claim 1, wherein the adhesive is epoxy resin.

9. A package according to claim 8, wherein the insert is a push fit with respect to the sleeve.

10. A package according to claim 1, wherein the insert is a push fit with respect to the sleeve.

11. A package according to claim 1, wherein the adhesive is epoxy resin.

12. A package according to claim 1, wherein the insert is a push fit with respect to the sleeve.

13. A method of assembling a hermetically sealed package comprising the steps of:
   a) inserting an insert into a distal portion of a sleeve having an internal tapered surface, the insert having an external conical face adjacent the internal tapered surface and an internal bore extending therethrough and terminating in a counter bore;

b) guiding an optical fibre along the sleeve from a proximal portion thereof and through the bore;

c) applying a quantity of adhesive to a remote region of the optical fibre; and d) drawing the optical fibre through the sleeve whereby the adhesive is caused to flow along the tapered surface between the insert and the sleeve and along the counter bore between the counter bore and the optical fibre to form respective seals therewith.

14. A method according to claim 13, further comprising the step of stripping external layers of an optical cable to reveal a length of optical fibre for insertion through the bore of the insert.

15. A method according to claim 14, wherein the stripping step comprises fully stripping a length (L) of optical fibre of its outer layers and partially stripping a further length (l) of a protective outer layer but retaining at least one intermediate layer over the further length.

16. A method of assembling a hermetically sealed package comprising the steps of:

a) inserting an insert into a distal portion of a sleeve, the insert having a bore therethrough;

b) preparing an optical fibre by stripping an optical cable to reveal a length of fully exposed optical fibre and a further length partially stripped of a protective outer layer but retaining at least one intermediate layer;

c) guiding the exposed length of optical fibre along the sleeve from a proximal portion thereof and through the bore;

d) applying a quantity of adhesive to a remote region of the exposed length of optical fibre; and e) drawing the optical fibre through the sleeve whereby the adhesive is caused to flow between the insert and the sleeve and between the bore and the optical fibre to form respective seals therewith, while locating an end of the further length of partially stripped optical fibre adjacent the insert.

17. A method according to claim 16, wherein the quantity of adhesive is located on the exposed length of optical fibre adjacent the partially stripped further length.

18. A hermetically sealed structure comprising:

an outer sleeve having an internal tapered surface and being manufactured from material resistant to moisture ingress;

an insert located within the sleeve at one end portion thereof, the insert having an external conical face adjacent the internal tapered surface and an internal bore extending therethrough and terminating in a counter bore; and an optical fibre extending through the bore and extending beyond the end portion of the sleeve, wherein respective adhesive films secure the insert to the sleeve and the optical fibre to the insert.

19. A package according to claim 1, wherein the portion of optical fibre provided with the at least one intermediate surrounding layer terminates within the counter bore.

\* \* \* \* \*

UNITED STATES PATENT AND TRADEMARK OFFICE
CERTIFICATE OF CORRECTION

PATENT NO. : 6,220,766 B1  Page 1 of 1
DATED : April 24, 2001
INVENTOR(S) : Jonathan C. Yeandle et al.

It is certified that error appears in the above-identified patent and that said Letters Patent is hereby corrected as shown below:

Title page, Item [56],
References Cited, U.S. PATENT DOCUMENTS: S"5,649,030" should read
-- 5,649,039 --.

Column 3,
Line 32, "The diameter $d_2$" should read -- The diameter $d_1$ --.

Signed and Sealed this

Thirteenth Day of November, 2001

*Attest:*

Nicholas P. Godici

NICHOLAS P. GODICI
*Attesting Officer*   *Acting Director of the United States Patent and Trademark Office*